US008115178B2

(12) United States Patent
Marrs et al.

(10) Patent No.: US 8,115,178 B2
(45) Date of Patent: Feb. 14, 2012

(54) LARGE DYNAMIC RANGE RADIATION DETECTOR AND METHODS THEREOF

(75) Inventors: Roscoe E. Marrs, Livermore, CA (US); Norman W. Madden, Sparks, NV (US)

(73) Assignee: Lawrence Livermore National Security, LLC., Livermore, CA (US)

( * ) Notice: Subject to any disclaimer, the term of this patent is extended or adjusted under 35 U.S.C. 154(b) by 368 days.

(21) Appl. No.: 12/431,595

(22) Filed: Apr. 28, 2009

(65) Prior Publication Data
US 2010/0270471 A1 Oct. 28, 2010

(51) Int. Cl.
*G01T 1/20* (2006.01)
(52) U.S. Cl. ................................. 250/370.11
(58) Field of Classification Search ............ 250/370.01–370.15, 362, 363.01–363.1, 366, 367; 378/98.8
See application file for complete search history.

(56) References Cited

U.S. PATENT DOCUMENTS

| | | | |
|---|---|---|---|
| 4,767,929 A | 8/1988 | Valentine | 250/370.07 |
| 6,225,618 B1 * | 5/2001 | Rushing et al. | 250/214 AG |
| 6,750,953 B1 * | 6/2004 | Douglas | 356/4.08 |
| 6,998,624 B2 | 2/2006 | Katagiri | 250/484.5 |
| 2008/0103391 A1 * | 5/2008 | Dos Santos Varela | 600/436 |
| 2008/0315110 A1 * | 12/2008 | Iwatschenko-Borho et al. | 250/394 |
| 2009/0252450 A1 * | 10/2009 | Korman | 385/13 |

OTHER PUBLICATIONS

Starman et al., Parameter investigation and first results from a digital flat panel detector with forward bias capability, 2008, SPIE Proceedings, vol. 6913, pp. 69130L-1 to 89130L-9.*
Stapels, C. J., F. L. Augustine et al. (2006). Characterization of CMOS solid-state photomultiplier for a digital radiation rate meter. 2006 IEEE Nuclear Science Symposium Conference Record. San Diego, CA. Piscataway, NJ: IEEE. vol. 2: 918-922.
Rybka, A. V., L. N. Davydov et al. (2004). "Gamma-radiation dosimetry with semiconductor CdTe and CdZnTe detectors." Nuclear Instruments & Methods in Physics Research Section a—Accelerators Spectrometers Detectors and Associated Equipment 531 (1-2): 147-156.
Gavrovski, C. V. and V. N. Filiposki (2003). One solution for eliminating the problem of detector saturation in portable instruments for ionizing radiation. Proceedings of the 12th International Scientific and Applied Science Conference "Electronics ET'2003". Sozopol, Bulgaria. Sep. 24-26, 2003.
Brunett, B. A., J. C. Lund et al. (1999). Low-cost cadmium zinc telluride radiation detectors based on electron-transport-only designs. SAND99-8215: Sandia National Laboratories: 70 pages.
Danshin, E. A., L. A. Piven et al. (1991). "Use of scintillator-photodiode detector in counting mode in dosimetry." Instruments and Experimental Techniques 34 (4): 807-10.
Jiang, S., M. Horng et al. (1990). "Radiation instrumentation with the microelectronical technique." Nuclear Instruments and Methods in Physics Research, Section A 299 (1-3): 298-301.

(Continued)

*Primary Examiner* — Kiho Kim
(74) *Attorney, Agent, or Firm* — Eddie E. Scott

(57) ABSTRACT

According to one embodiment, a radiation detector comprises a scintillator and a photodiode optically coupled to the scintillator. The radiation detector also includes a bias voltage source electrically coupled to the photodiode, a first detector operatively electrically coupled to the photodiode for generating a signal indicative of a level of a charge at an output of the photodiode, and a second detector operatively electrically coupled to the bias voltage source for generating a signal indicative of an amount of current flowing through the photodiode.

26 Claims, 3 Drawing Sheets

OTHER PUBLICATIONS

Uyttenhove, J. and J. Demuynck (1987). "Detector electronics for measurements in heavy overload conditions." Nuclear Instruments & Methods in Physics Research, Section A (Accelerators, Spectrometers, Detectors and Associated Equipment) A253: 450-2.

Fairstein, E. (1975). "Gated Baseline Restorer with Adjustable Asymmetry." IEEE Transactions on Nuclear Science 22 (1): 463-466.

De Geronimo et al., "A CMOS detector leakage current self-adaptable continuous reset system: Theoretical analysis" Nuclear Instruments and Methods in Physics Research A 421 (1999) 322-333 Elsevier Science B.V. 1999.

Pullia et al., "Extending the dynamic range of nuclear pulse spectrometers" Review of Scientific Instruments 79, 036105 (2008) 2008 American Institute of Physics.

Stapels et al., "Characterization of CMOS Solid-State Photomultiplier for a Digital Radiation Rate Meter" Nuclear Science Symposium Conference Record, 2006, IEEE; Oct. 29, 2006-Nov. 1, 2006, vol. 2, pp. 918-922.

Danshin et al., "Use of Scintillator-Photodiode Detector in Counting Mode in Dosimetry" 1992 Plenum Publishing Corporation; pp. 807-810.

* cited by examiner

LARGE DYNAMIC RANGE RADIATION DETECTOR AND METHODS THEREOF

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to radiation detectors, and more particularly to large dynamic range radiation detectors.

BACKGROUND

Large numbers of radiation detectors are in use to search for radioactive sources or detect radiation hazards. For example, many fire departments and other emergency responders are equipped with radiation detectors, for use when investigating a scene before entering to battle the blaze. Typically, these detectors are Geiger counters that measure relatively low levels of gamma radiation. Such detectors saturate and become useless in a high radiation field that might be produced by fallout from a nuclear explosion, a reactor accident, mishandling or release of a strong radioactive source, and/or malicious release of radiation.

Other types of radiation detectors, such as a silicon semiconductor diode or an ionization chamber, can measure very high radiation fields. However, they are unable to detect the more common lower intensity sources of radiation normally encountered. Also, none of these detector types is able to measure gamma-ray spectra, which is required in order to identify the type of radiation source. More sophisticated and expensive radiation detectors are required to independently measure gamma-ray spectra to determine the nature of the radiation source.

Therefore, a radiation detector that is capable of measuring radiation in low level and high level fields, as well as measuring gamma-ray spectra, would be beneficial.

SUMMARY

According to one embodiment, a radiation detector comprises a scintillator and a photodiode optically coupled to the scintillator. The radiation detector also includes a bias voltage source electrically coupled to the photodiode, a first detector operatively electrically coupled to the photodiode for generating a signal indicative of a level of a charge at an output of the photodiode, and a second detector operatively electrically coupled to the bias voltage source for generating a signal indicative of an amount of current flowing through the photodiode.

In another embodiment, a radiation detector comprises a scintillator, a photodiode optically coupled to the scintillator, and a bias voltage source electrically coupled to the photodiode. The radiation detector also includes a charge sensitive amplifier operatively electrically coupled to the photodiode for generating a signal indicative of a level of a charge at an output of the photodiode and a current sensitive amplifier operatively electrically coupled to the bias voltage source for indicating an amount of current flowing through the photodiode, wherein the charge sensitive amplifier is operative at lower levels of current passing through the photodiode, and wherein the charge sensitive amplifier becomes saturated at higher levels of current passing through the photodiode, and wherein the current sensitive amplifier outputs a response that is about proportional to the amount of current flowing through the photodiode at the higher levels.

According to another embodiment, a method comprises generating a first signal indicative of a level of a charge at an output of a photodiode at lower current levels, the photodiode being optically coupled to a scintillator. The method also includes generating a second signal indicative of an amount of current flowing through the photodiode at higher current levels relative to the lower current levels and outputting a derivative of at least one of the signals.

Other aspects and advantages of the present invention will become apparent from the following detailed description, which, when taken in conjunction with the drawings, illustrate by way of example the principles of the invention.

DETAILED DESCRIPTION

Figure 1:
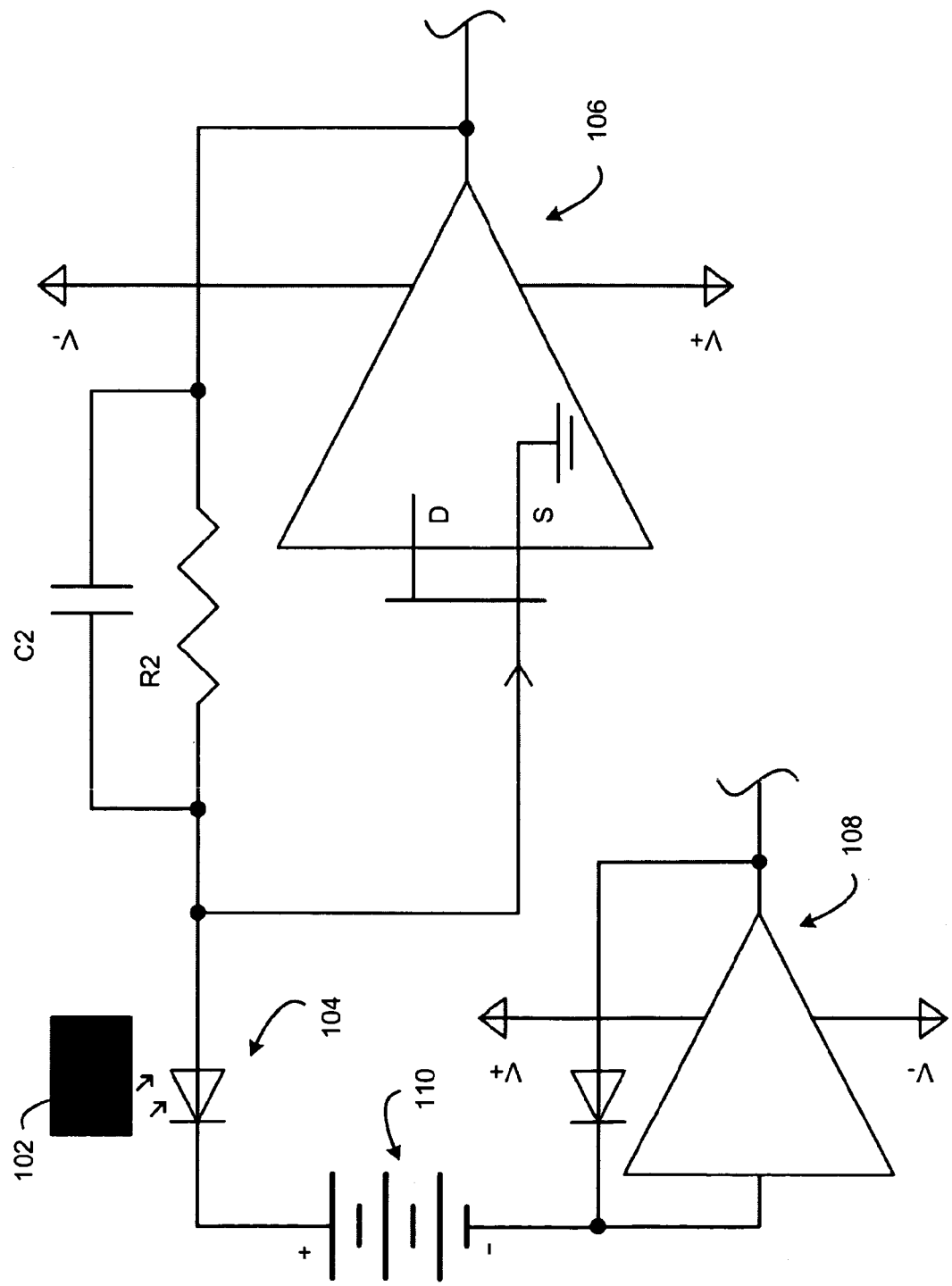
FIG. 1 shows a simplified schematic of a circuit for radiation detection including a current sensitive log amplifier according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a radiation detector includes a scintillator, a photodiode optically coupled to the scintillator, a bias voltage source electrically coupled to the photodiode, a first detector operatively electrically coupled to the photodiode for generating a signal indicative of a level of a charge at an output of the photodiode, and a second detector operatively electrically coupled to the bias voltage source for generating a signal indicative of an amount of current flowing through the photodiode.

In another general embodiment, a radiation detector comprises a scintillator, a photodiode optically coupled to the scintillator, a bias voltage source electrically coupled to the photodiode, a charge sensitive preamplifier operatively electrically coupled to the photodiode for generating a signal indicative of a level of a charge at an output of the photodiode, and a current sensitive amplifier operatively electrically coupled to the bias voltage source for indicating an amount of current flowing through the photodiode, wherein the charge sensitive preamplifier is operative at lower levels of current passing through the photodiode, wherein the charge sensitive preamplifier becomes saturated at higher levels of current passing through the photodiode, and wherein the current sensitive amplifier outputs a response that is proportional to the amount of current flowing through the photodiode at the higher levels.

In another general embodiment, a method includes generating a first signal indicative of a level of a charge at an output of a photodiode at lower current levels, the photodiode being optically coupled to a scintillator; generating a second signal indicative of an amount of current flowing through the photodiode at higher current levels relative to the lower current levels; and outputting a derivative of at least one of the signals.

According to some embodiments, a detector comprises a scintillator optically coupled to a photodiode or avalanche photodiode. The scintillator may be cesium iodide thallium doped, lanthanum trichloride doped with cerium, or any other material selected for cost and performance, as would be known to one of ordinary skill in the relevant art. In low radiation fields, electrical pulses from the photodiode, produced by single gamma-ray photons, may be individually amplified, digitized, and recorded for the purpose of obtaining an energy distribution spectrum. The individual pulses may also be counted, and the count rate may be used to provide a measure of the radiation intensity. In radiation fields so intense that counting individual pulses is not possible, the total current drawn by the photodiode, which remains proportional to the incident ionizing radiation, is used as a measure of the radiation intensity. Logarithmic circuits or other known mechanisms may be used to provide a consistent and accurate measure of radiation intensity for all levels of radiation over the full dynamic range of the detector.

The detector, according to some embodiments, may be configured to operate in a fixed location or as a mobile detector. It may also be configured for unattended operation and remote readout, or as a user operated unit. The detector may also be configured with scintillators appropriate for detecting radiation other than gamma rays, such as neutrons. Of course, more than one scintillator may be used in the detector, thus enhancing the range of radiation types that can be detected.

Now referring to FIG. 1, a simplified schematic of a system is shown. The system includes a scintillator 102 optically coupled to a semiconductor photodiode 104 and a first detector, which in this example is a low noise charge sensitive preamplifier 106. When gamma-rays are incident on the scintillator 102, a proportional number of visible photons (light) are generated. Some fraction of these visible photons is converted into a proportional charge in the reversed biased photodiode 104. The low noise preamplifier 106 integrates the proportional charge from the photodiode 104 and creates a corresponding voltage signal at its output. This voltage signal may be further processed, e.g., with a low noise pulse shaping amplifier (not shown) and ultimately digitized. The energy of each individual gamma-ray may be measured in this way, which in turn enables gamma-ray spectroscopy. Note that a feedback loop and optional filtering elements, e.g., a capacitor C2, a resistor R2, etc. may be present. When a sufficiently large amount of gamma-ray energy interacts in the scintillator 102, the charge sensitive preamplifier 106 can exceed its dynamic range. When this occurs, the instrument is rendered useless unless there is something that can continue operation of the device.

To rectify this type of situation, additional circuitry may be provided, including a second detector, which in this example is a current sensitive log amplifier 108 that enables a proportional current mode of operation. When the amount of incident gamma-ray energy exceeds the dynamic range of the charge sensitive preamplifier 106, the preamplifier's virtual ground fails. This failure of the virtual ground causes the gate of the charge sensitive preamplifier's low noise junction Field Effect Transistor (FET) to become forward biased. At this point, no further spectroscopy is possible. However, a proportional current continues to flow out of the bias supply 110, through the photodiode 104, and into the forward biased gate of the FET. If a current sensitive log amplifier 108 of sufficiently high impedance is used as the return path for the bias voltage supply 110, this proportional current can be measured and may extend many additional decades (5-7) beyond the limitations of the charge sensitive preamplifier 106.

Figure 2:
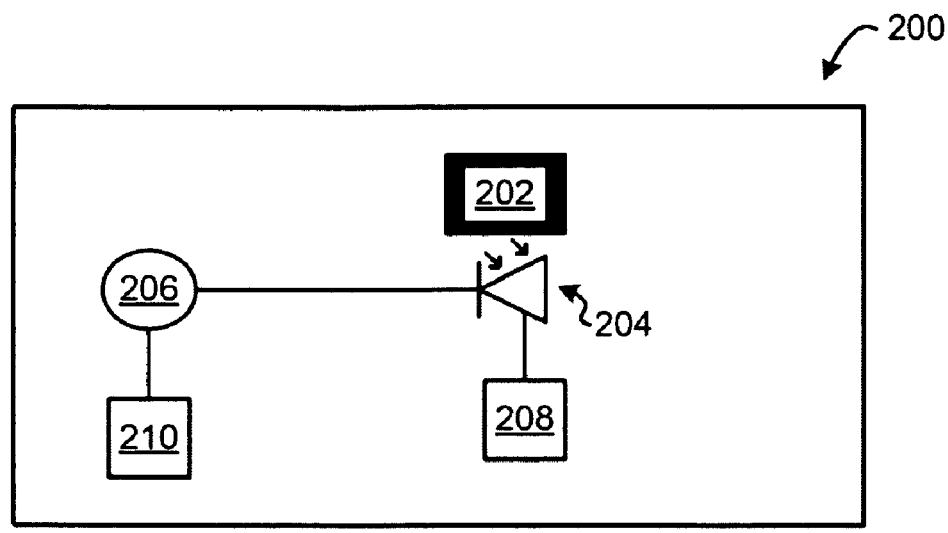
FIG. 2 shows a simplified schematic of a device for radiation detection according to one embodiment.

Now referring to FIG. 2, a radiation detector 200 can be described according to one embodiment. Note that the various embodiments presented herein may refer to a unitary radiation detector device, a radiation detector system comprising multiple devices coupled together, etc. The radiation detector 200 includes a scintillator 202. Any type of scintillator known in the art may be used. Moreover, the scintillator 202 may be selected for detecting any type of radiation, e.g., gamma rays, alpha particles, beta particles, neutrons, etc. Also, the radiation detector 200 includes a photodiode 204 optically coupled to the scintillator 202. The output current and/or voltage of the photodiode 204 changes based on an amount of incident light. Any type of photodiode 204 may be used as would be known to one of ordinary skill in the relevant art. The radiation detector 200 also includes a bias voltage source 206 electrically coupled to the photodiode 204 and a first detector 208 operatively electrically coupled to the photodiode 204 for generating a signal indicative of a level of a charge at an output of the photodiode 204. In addition, the radiation detector 200 includes a second detector 210 operatively electrically coupled to the bias voltage source 206 for generating a signal indicative of an amount of current flowing through the photodiode 204.

In some embodiments, the photodiode 204 may be an avalanche photodiode. For example, the photodiode 204 may operate with a substantially higher reverse bias. This may allow for each photo-generated carrier to be multiplied by avalanche breakdown (which allows high current flows through materials which are generally good insulators). Avalanche breakdown may result in internal gain within the photodiode 204, which may increase the effective responsivity of the radiation detector 200.

According to more embodiments, the first detector 208 may be a charge sensitive amplifier. A charge sensitive amplifier may be an integrator which includes an operational amplifier with capacitive feedback. For example, the charge sensitive amplifier may be a resistive feedback amplifier and/or a pulsed-reset amplifier. Any type of charge sensitive amplifier as would be known to one of skill in the relevant art may be used.

In some more embodiments, the second detector 210 may be a current sensitive amplifier, similar to those described above in relation to the first detector 208, whether the first detector 208 is a charge sensitive amplifier or not. In further embodiments, the second detector 210 may be a log amplifier, a linear amplifier, an autoranging amplifier, etc.

In more embodiments, the first detector 208 may be operative at lower levels of current passing through the photodiode 204. The first detector 208 may become saturated at higher levels of current passing through the photodiode 204, and the second detector 210 may output a response that is about proportional to the amount of current flowing through the photodiode 204 at the higher levels.

Various embodiments may contain circuitry for performing various functions, including those set forth above. The various circuitry described herein may be part of the detectors described, the device housing the scintillator, coupled thereto as part of an overall radiation detector system, etc. For example, the various circuitry described herein may he included in a radiation detection system that may he used in a laboratory. In another approach, the circuitry may be included in a radiation detection system installed at an airport security checkpoint. In yet another approach, the circuitry may be included in a transportable radiation system that may be included with first responders to emergency situations, such that the risks of radiation may be assessed to the first responders.

In some more embodiments, the first detector 208 may amplify electrical pulses from the photodiode 204. Also, the radiation detector 200 may further comprise circuitry coupled to the first detector 208 for digitizing and recording the amplified electrical pulses. The recording can be transient, e.g., in a memory, register, etc., or can be semi-permanent or permanent, e.g., stored on a recording medium such as solid state memory (e.g., flash memory), hard disk, etc. Moreover, the recording can be on the device itself or on a connected device, e.g., laptop, which may thus be part of the overall system.

The radiation detector 200 may further comprise, in some embodiments, circuitry for generating an energy distribution spectrum using the digitized values of the electrical pulses and circuitry for outputting the energy distribution spectrum. Circuitry for outputting the energy distribution spectrum is known in the art, and may be integrated with the device, on a separate system coupled to the device, etc. The energy distribution spectrum may be output to a data storage device, a display device, etc.

In some approaches, the radiation detector 200 may further comprise circuitry for counting electrical pulses from the photodiode 204, e.g., by counting signal pulses generated by the first detector 208, and circuitry for providing an indication of radiation intensity based on the counting. The indication of radiation intensity may be visual, audible, etc. In further approaches, the radiation detector 200 may comprise circuitry for providing an indication of radiation intensity based on the signal indicative of the amount of current flowing through the photodiode 204. This circuitry may be particularly useful when a number of pulses are above a threshold, when the scintillator is emitting so many photons that individual pulses are no longer readily discernable, etc.

Figure 3:
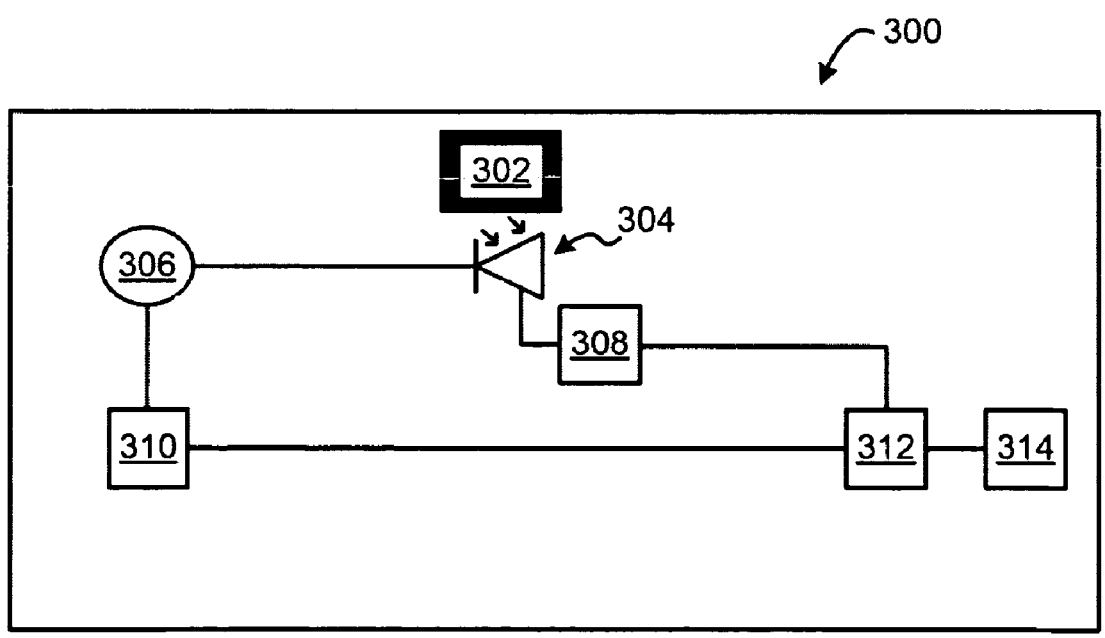
FIG. 3 shows a simplified schematic of a device for radiation detection according to one embodiment.

Now referring to FIG. 3, a radiation detector is described according to another embodiment. The radiation detector 300 includes a scintillator 302. Any type of scintillator known in the art may be used. Moreover, the scintillator 302 may be selected for detecting any type of radiation, e.g., gamma rays, alpha particles, beta particles, neutrons, etc. In addition, the radiation detector 300 includes a photodiode 304 optically coupled to the scintillator 302 and a bias voltage source 306 electrically coupled to the photodiode 304. Also, a charge sensitive amplifier 308 is operatively electrically coupled to the photodiode 304 for generating a signal indicative of a level of a charge at an output of the photodiode 304, and a current sensitive amplifier 310 is operatively electrically coupled to the bias voltage source 306 for indicating an amount of current flowing through the photodiode 304. The charge sensitive amplifier 308 may be operative at lower levels of current passing through the photodiode 304, wherein the charge sensitive amplifier 308 becomes saturated at higher levels of current passing through the photodiode 304. Also, the current sensitive amplifier 310 may output a response that is about proportional to the amount of current flowing through the photodiode 304 at the higher levels (and particularly at the lower levels).

In some approaches, the charge sensitive amplifier 308 may amplify electrical pulses from the photodiode 304, and may further comprise circuitry coupled to the charge sensitive amplifier 308 for digitizing and recording the amplified electrical pulses. In further approaches, the charge sensitive amplifier 308 may comprise circuitry for generating an energy distribution spectrum using the digitized values of the electrical pulses and circuitry for outputting the energy distribution spectrum.

In some more embodiments, the radiation detector 300 may further comprise output electronics 312, e.g., for counting electrical pulses from the photodiode 304, and circuitry 314 for providing an indication of radiation intensity based on the counting. In further embodiments, the radiation detector 300 may comprise output electronics 312 for providing an indication of radiation intensity based on the signal indicative of the amount of current flowing through the photodiode 304.

Figure 4:
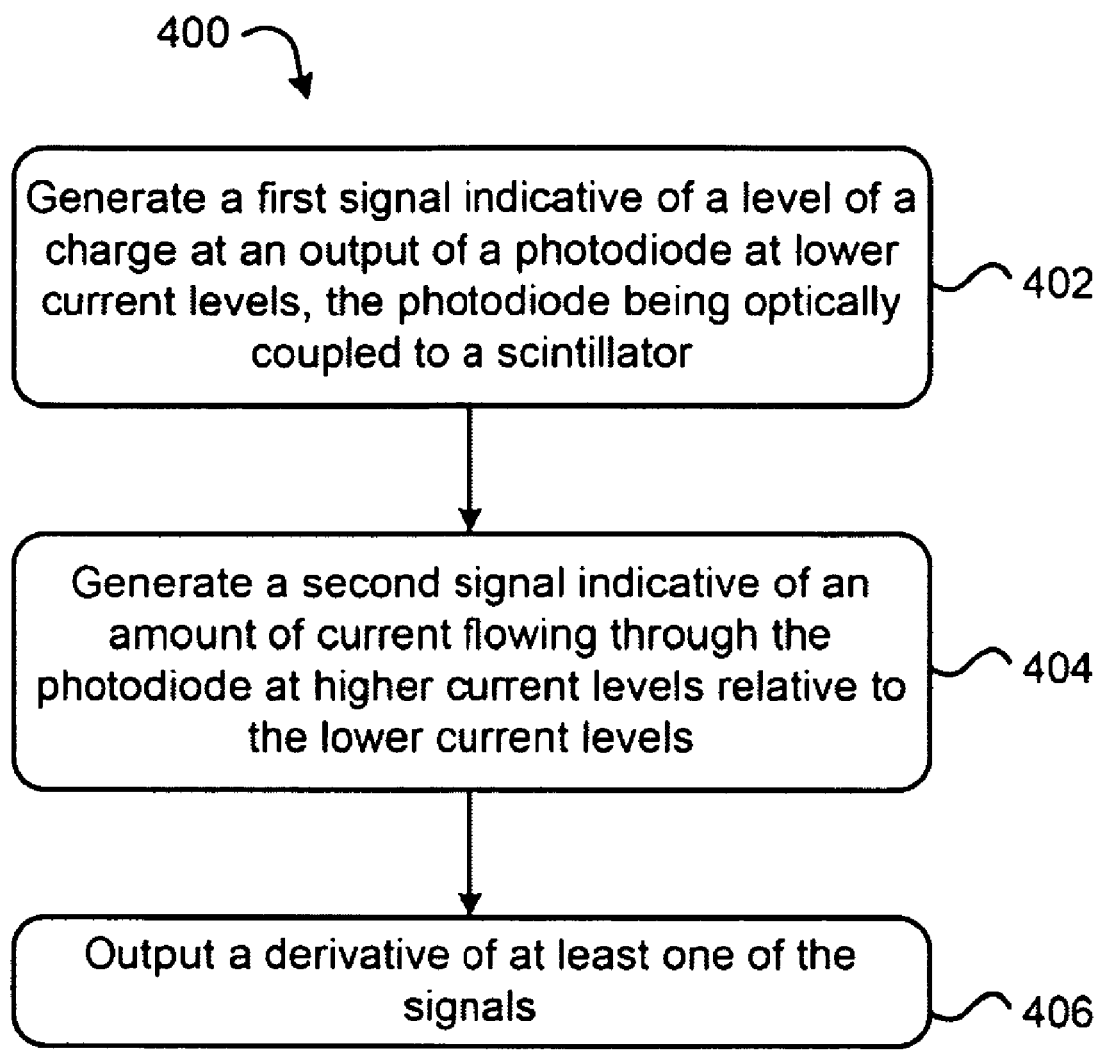
FIG. 4 shows a method for radiation detection according to one embodiment.

Now referring to FIG. 4, a method 400 is described. The method 400 may be carried out in any desired environment. Any of the features and embodiments described in reference to FIGS. 1-3 may be applied to the description of method 400.

In operation 402, a first signal indicative of a level of a charge at an output of a photodiode at least at lower current levels is generated. The photodiode is optically coupled to a scintillator.

In some embodiments, electrical pulses from the photodiode may be counted at the lower current levels, and an indication of radiation intensity may be provided based on the counting. In some further embodiments, the method 400 may further comprise providing an indication of radiation intensity based on the second signal indicative of the amount of current flowing through the photodiode at the higher current levels.

In operation 404, a second signal indicative of an amount of current flowing through the photodiode at least at higher current levels relative to the lower current levels is generated.

According to some approaches, the first signal may be generated at lower levels of current passing through the photodiode. The first signal may either not be generated or stabilizes (e.g., flattens out) at higher levels of current passing through the photodiode. Also, the second signal may be about proportional to the amount of current flowing through the photodiode at the higher levels.

In operation 406, a derivative of at least one of the signals is output. The derivative may be, for example, an indication of radiation intensity, a characterization of the radiation, an indication of radiation type, etc.

In some embodiments, the method 400 may further comprise using a charge sensitive amplifier for generating the signal indicative of a level of a charge at an output of the photodiode. In other embodiments, the method 400 may further comprise using a current sensitive amplifier for generating the signal indicative of a level of a current flowing through the photodiode.

Also, the first signal may include amplified electrical pulses from the photodiode according to some embodiments, and may further comprise digitizing and recording the amplified electrical pulses. In some further embodiments, an energy distribution spectrum may be generated using the digitized values of the electrical pulses. Also, the energy distribution spectrum may be output.

The invention, in one or more embodiments, may be useful for many different applications. For example, the large dynamic range radiation detector could be used to measure radiation fields that are large enough to cause injury or death, as well as weak fields commonly encountered while searching for radiation sources. The detector could be used by government agencies or others who need to respond to or characterize a nuclear incident. Also, additional uses include radiation monitoring at nuclear facilities and/or nuclear powered vessels such as submarines and aircraft carriers. In addition, the large dynamic range radiation detector could be used for radiation monitoring in laboratories, universities, hospitals, doctor's offices and anywhere else that radioactive sources are used and produce radiation.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A radiation detector, comprising:
a scintillator;
a photodiode optically coupled to the scintillator;
a bias voltage source electrically coupled to the photodiode for biasing the photodiode in a first direction;
a first detector operatively electrically coupled to the photodiode for generating a signal indicative of a level of a charge at an output of the photodiode when biased in the first direction; and
a second detector operatively electrically coupled to the bias voltage source for generating a signal indicative of an amount of current flowing through the photodiode when biased in the first direction.

2. The radiation detector of claim 1, wherein the photodiode is an avalanche photodiode.

3. The radiation detector of claim 1, wherein the first detector is a charge sensitive amplifier.

4. The radiation detector of claim 1, wherein the second detector is a current sensitive amplifier.

5. The radiation detector of claim 4, wherein the second detector is a log amplifier.

6. The radiation detector of claim 4, wherein the second detector is a linear amplifier.

7. The radiation detector of claim 4, wherein the second detector is an autoranging amplifier.

8. The radiation detector of claim 1, wherein the first detector is operative at lower levels of current passing through the photodiode, wherein the first detector becomes saturated at higher levels of current passing through the photodiode, wherein the second detector outputs a response that is about proportional to the amount of current flowing through the photodiode at the higher levels.

9. The radiation detector of claim 1, wherein the first detector amplifies electrical pulses from the photodiode, and further comprising circuitry coupled to the first detector for digitizing and recording the amplified electrical pulses.

10. The radiation detector of claim 9, further comprising circuitry for generating an energy distribution spectrum using the digitized values of the electrical pulses and circuitry for outputting the energy distribution spectrum.

11. The radiation detector of claim 1, further comprising circuitry for counting electrical pulses from the photodiode, and circuitry for providing an indication of radiation intensity based on the counting.

12. A radiation detector of claim 1, further comprising circuitry for providing an indication of radiation intensity based on the signal indicative of the amount of current flowing through the photodiode.

13. A radiation detector comprising:
a scintillator;
a photodiode optically coupled to the scintillator;
a bias voltage source electrically coupled to the photodiode;
a first detector operatively electrically coupled to the photodiode for generating a signal indicative of a level of a charge at an output of the photodiode;
a second detector operatively electrically coupled to the bias voltage source for generating a signal indicative of an amount of current flowing through the photodiode; and
circuitry for providing an indication of radiation intensity based on the signal indicative of the amount of current flowing through the photodiode.

14. A radiation detector, comprising:
a scintillator;
a photodiode optically coupled to the scintillator;
a bias voltage source electrically coupled to the photodiode;
a charge sensitive amplifier operatively electrically coupled to the photodiode for generating a signal indicative of a level of a charge at an output of the photodiode; and
a current sensitive amplifier operatively electrically coupled to the bias voltage source for indicating an amount of current flowing through the photodiode,
wherein the charge sensitive amplifier is operative at lower levels of current passing through the photodiode, wherein the charge sensitive amplifier becomes saturated at higher levels of current passing through the photodiode,
wherein the current sensitive amplifier outputs a response that is about proportional to the amount of current flowing through the photodiode at the higher levels.

15. The radiation detector of claim 14, wherein the charge sensitive amplifier amplifies electrical pulses from the photodiode, and further comprising circuitry coupled to the charge sensitive amplifier for digitizing and recording the amplified electrical pulses.

16. The radiation detector of claim 15, further comprising circuitry for generating an energy distribution spectrum using the digitized values of the electrical pulses and circuitry for outputting the energy distribution spectrum.

17. The radiation detector of claim 14, further comprising circuitry for counting electrical pulses from the photodiode, and circuitry for providing an indication of radiation intensity based on the counting.

18. The radiation detector of claim 17, further comprising circuitry for providing an indication of radiation intensity based on the signal indicative of the amount of current flowing through the photodiode.

19. A method, comprising:
generating a first signal indicative of a level of a charge at an output of a photodiode at lower current levels, the photodiode being optically coupled to a scintillator;
generating a second signal indicative of an amount of current flowing through the photodiode at higher current levels relative to the lower current levels; and
providing an indication of radiation intensity based on the second signal indicative of the amount of current flowing through the photodiode at the higher current levels.

20. The method of claim 19, further comprising using a charge sensitive amplifier for generating the signal indicative of a level of a charge at an output of the photodiode.

21. The method of claim 19, further comprising using a current sensitive amplifier for generating the signal indicative of a level of a current flowing through the photodiode.

22. The method of claim 19, wherein the first signal includes amplified electrical pulses from the photodiode, and further comprising digitizing and recording the amplified electrical pulses.

23. The method of claim 22, further comprising generating an energy distribution spectrum using the digitized values of the electrical pulses, and outputting the energy distribution spectrum.

24. The method of claim 19, further comprising counting electrical pulses from the photodiode at the lower current levels, and providing an indication of radiation intensity based on the counting.

25. The method of claim 19, further comprising outputting a derivative of the first signal.

26. A method, comprising:
generating a first signal indicative of a level of a charge at an output of a photodiode at lower current levels, the photodiode being optically coupled to a scintillator;
generating a second signal indicative of an amount of current flowing through the photodiode at higher current levels relative to the lower current levels; and
outputting a derivative of at least one of the signals,
wherein the first signal is generated at lower levels of current passing through the photodiode, wherein the first signal is either not generated or stabilizes at higher levels of current passing through the photodiode, wherein the second signal is about proportional to the amount of current flowing through the photodiode at the higher levels.

* * * * *